W. D. ROBB.
Fire-Places.
No. 140,543.
2 Sheets--Sheet 2.
Patented July 1, 1873.
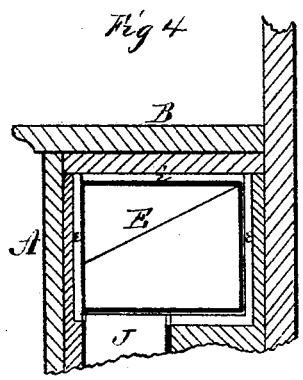
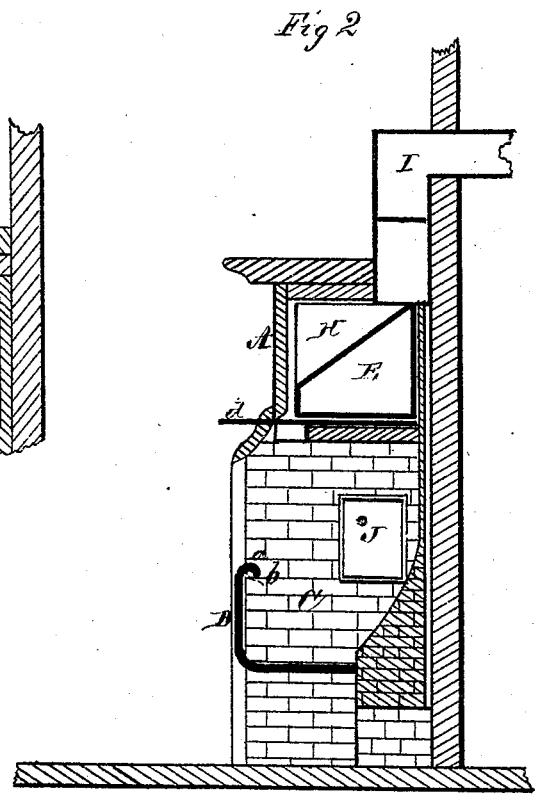
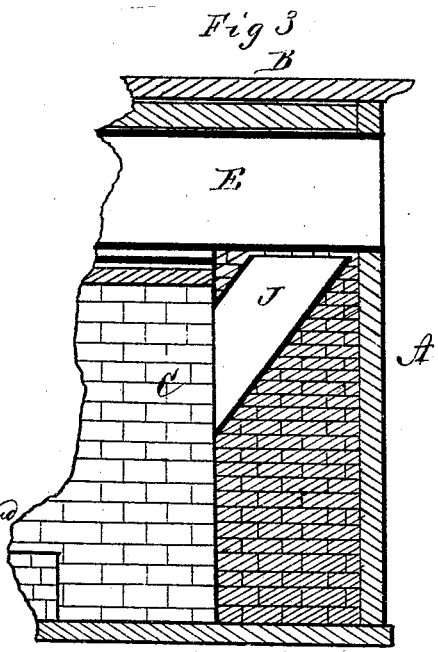

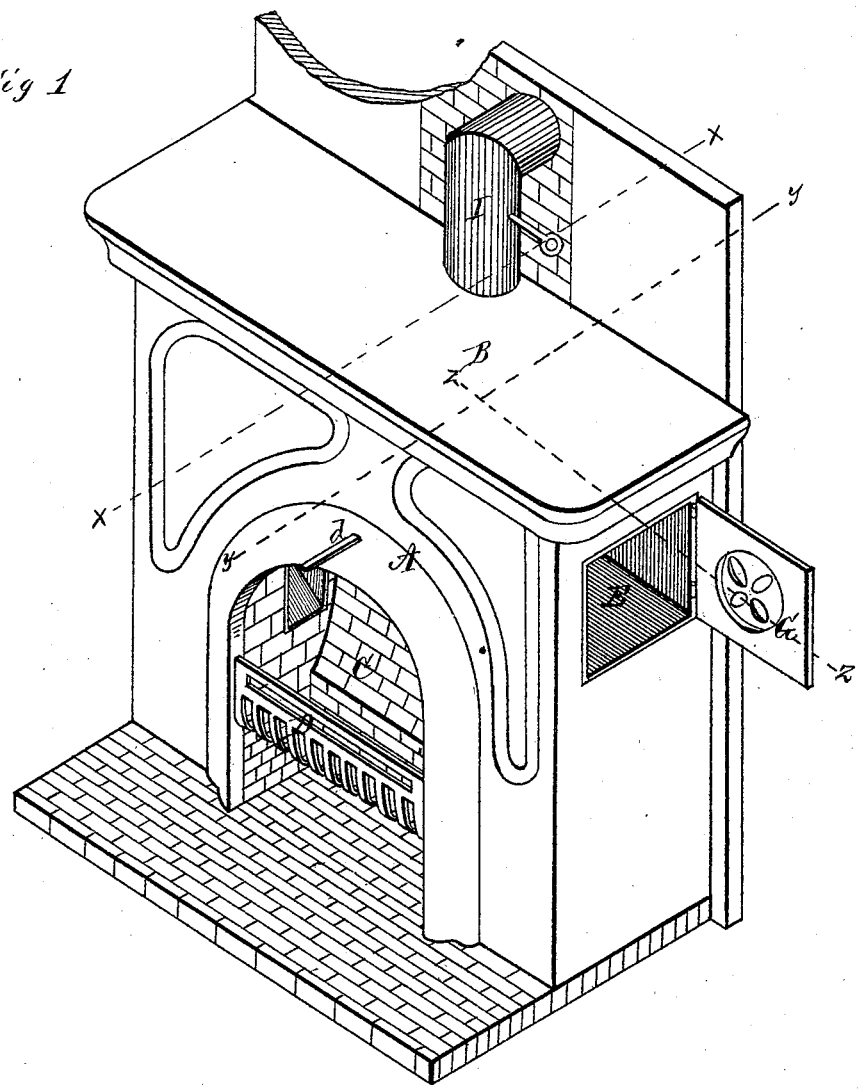

UNITED STATES PATENT OFFICE.

WILLIAM D. ROBB, OF NEW PHILADELPHIA, OHIO.

IMPROVEMENT IN FIRE-PLACES.

Specification forming part of Letters Patent No. 140,543, dated July 1, 1873; application filed April 3, 1873.

*To all whom it may concern:*

Be it known that I, WILLIAM DENRELLE ROBB, of New Philadelphia, in the county of Tuscarawas and in the State of Ohio, have invented certain new and useful Improvements in Combined Fire-Place and Oven; and do hereby declare that the following is a full, clear, and exact description thereof, reference being had to the accompanying drawings and to the letters of reference marked thereon, making a part of this specification.

The nature of my invention consists in the construction and arrangement of a combined fire-place and oven, as will be hereinafter more fully set forth.

In order to enable others skilled in the art to which my invention appertains to make and use the same, I will now proceed to describe its construction and operation, referring to the annexed drawings, in which—

Figure 1 is a perspective view of my grate and oven. Fig. 2 represents a section taken through line $x\ x$, Fig. 1. Fig. 3 represents a section taken through line $y\ y$, Fig. 1. Fig. 4 represents a section taken through line $z\ z$, Fig. 1.

A represents the outside casing, and B the top, which are made of cast-iron in any suitable manner, and the interior is all made of brick and mortar, except the oven and pockets. C is the fire-place, and D the grate in the same. The grate may be made in any desired manner, and provided on each side, at the upper end, with a hook, $a$, which fits over a lug or projection, $b$, formed on the inner edge of the cast-iron front or casing A. E represents the oven, which is made of sheet-iron, and placed above the fire-place C, extending from end to end, G G being the doors to said oven, one at each end, and these doors provided with registers, as shown in Fig. 1. Below this oven is a damper, $d$, which opens or closes the direct draft. When the damper is open the smoke and heat pass directly up through a flue, H, formed in the center of the oven and through a pipe, I, into the chimney; but when the damper is closed the smoke and heat will pass up at the sides and through cast-iron or clay passages J J, and up through flues $e\ e$ at the front and back of the oven into a chamber, $i$, at the top of the oven, and from thence through the pipe I into the chimney.

When the oven is not in use for baking or roasting, the registers in the doors G G are to be opened to let the hot air into the room.

Having thus fully described my invention, what I claim as new, and desire to secure by Letters Patent, is—

1. The arrangement of the passages J J, flues $e\ e$, chamber $i$, and exit-pipe I, substantially as shown and described.

2. The combination of the casing A B, fire-place C, side passages J J, flues E E, chamber $i$, oven E, damper $d$, flue H, and pipe I, all constructed as described.

In testimony that I claim the foregoing I have hereunto set my hand and seal this 10th day of March, 1873.

WILLIAM DENRELLE ROBB. [L. S.]

Witnesses:
  J. H. BAMHILL,
  J. H. BOOTH.